United States Patent [19]
Suga

[11] 3,809,905
[45] May 7, 1974

[54] TEMPERATURE COMPENSATING ULTRAVIOLET RAY DETECTOR

[76] Inventor: Shigeru Suga, Yoyogi 5-20-2, Shibuyaku, Tokyo, Japan

[22] Filed: Feb. 7, 1973

[21] Appl. No.: 330,245

[52] U.S. Cl................ 250/370, 250/372, 324/94
[51] Int. Cl. ............................................. G01t 1/24
[58] Field of Search ............ 250/370, 372; 136/89; 324/93, 94

[56] References Cited
UNITED STATES PATENTS

| | | | |
|---|---|---|---|
| 3,418,473 | 12/1968 | Blue | 250/370 |
| 3,198,945 | 8/1965 | Dewes et al. | 324/94 |
| 3,090,914 | 5/1963 | Kabak | 324/94 |
| 3,431,414 | 3/1969 | Bate et al. | 324/94 |
| 3,628,017 | 12/1971 | Lerner | 250/372 |
| 3,437,807 | 4/1969 | Moore | 250/372 |

Primary Examiner—Archie R. Borchelt
Assistant Examiner—Davis L. Willis
Attorney, Agent, or Firm—Wenderoth, Lind & Ponack

[57] ABSTRACT

A device in which an electrical current flowing through an electrolyte indicates a true value proportional to the intensity of ultraviolet rays, regardless of the ambient temperature. A positive characteristic heat sensing resistor is combined in series with an ultraviolet responsive semiconductor element in a circuit for measuring ultraviolet energies. This circuit includes a scale for indicating the amount of deposited mercury produced by electrolyzing mercury iodide solution with the photocurrent from said ultraviolet responsive semiconductor element. The positive characteristic heat sensing resistor is connected in parallel with the mercury electrolyte and the electrical circuit thereof.

1 Claim, 5 Drawing Figures

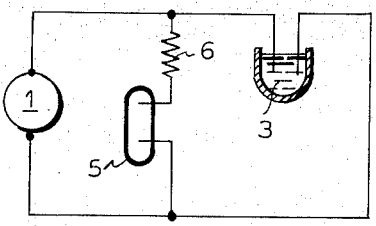
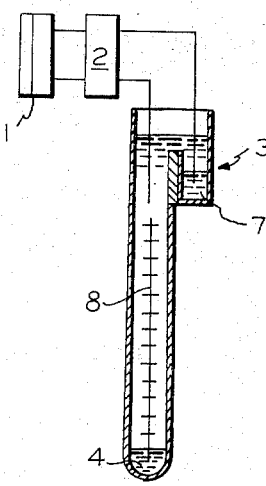
FIG.1
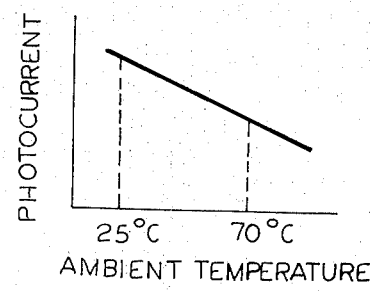
FIG.2
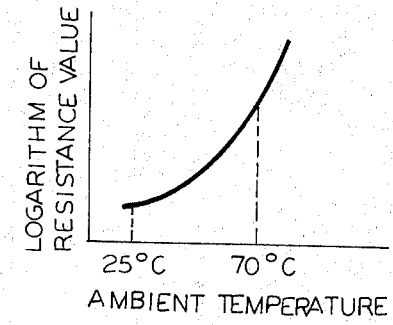
FIG.3
FIG.4
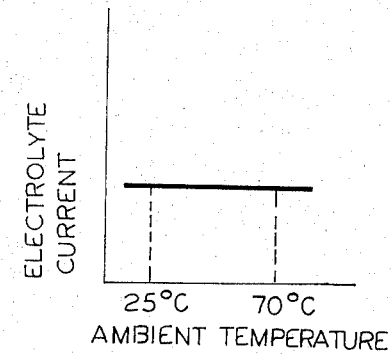
FIG.5

३,८०९,९०५

TEMPERATURE COMPENSATING ULTRAVIOLET RAY DETECTOR

BACKGROUND OF THE INVENTION

When measuring light energy such as from the sun or from artificial light sources, the light sensor is heated by the ambient temperature as well as by the radiant heat energy of the light source. This can result in large errors in such light energy measurements. Such errors can be significant when measuring light energies as integrated values for an extensive period of time on a continuous basis. To eliminate or minimize such errors, it has been proposed to provide the surrounding of the light sensor with cooling water or air to cool the light sensor itself. This, however, makes the light sensor somewhat bulky. In addition, this requires a rather complex and impractical cooling water or air feeding mechanism, since the light sensor in, for example, known weather instruments, must be turned around a light source. In a further attempt to eliminate or minimize such errors, it has been considered possible to cover the light sensor with a filter which cuts off the heat rays. However, the disadvantages described hereinbefore pertaining to the cooling of the light sensor also apply to the elimination of heat stored in the filter. In addition, such a filter has the defect of diminishing the energies in the wavelength domain, including ultraviolet rays, which are essential to the purpose of the light energy measurement.

In view of such defects as mentioned hereinbefore, it is an object of the present invention to provide a device, circuit and method for accurately measuring the integrated value of ultraviolet energy by combining a heat sensing resistor with an ultraviolet responsive semiconductor element in order to eliminate the effect of the ambient temperature. As a result, a fixed output can be obtained from the device, regardless of the change in the photocurrent caused by the change in the ambient temperature.

BRIEF DESCRIPTION OF THE DRAWINGS

The above and other objects and advantages of the invention will become apparent from the following detailed description taken together with the accompanying drawings, in which:

FIG. 1 is a sectional view of a device for sensing ultraviolet rays including means for eliminating the effect of the ambient temperature according to the invention;

FIG. 2 is an electrical circuit according to the invention;

FIG. 3 is a graph showing the temperature characteristics of a photocurrent produced by the element for sensing ultraviolet rays according to the invention;

FIG. 4 is a graph showing the temperature characteristics of the resistance value of a positive characteristic heat sensing resistor according to the invention; and FIG. 5 is a graph showing the relationship between an electrolytic current and the temperature showing the effect of the means for eliminating the effect of ambient temperature according to the invention.

DETAILED DESCRIPTION OF THE INVENTION

The invention concerns a device in which an electrical current flowing through an electrolyte indicates a true value proportional to the intensity of ultraviolet rays, regardless of the ambient temperature. This is accomplished by combining a positive characteristic heat sensing resistor in series with an ultraviolet responsive semiconductor element in a circuit for measuring ultraviolet energies. The energy measured is indicated by the amount of deposited mercury produced by electrolyzing a mercury iodide solution with the photocurrent from the ultraviolet responsive semiconductor element. The positive characteristic heat sensing resistor is connected in parallel with the mercury electrolyte and the electrical circuit thereof.

Referring to the drawing, and particularly to FIG. 1, an ultraviolet responsive semiconductor element 1 is connected to a circuit 2 for eliminating the influence of ambient temperatures. This circuit is connected to a measuring device generally indicated at 3 which includes a tubular electrolyte reservoir made of glass or transparent plastic, and which has a scale 8 calibrated on the outside thereof for indicating the amount of the electrolyte in the reservoir. The device also includes a mercury reservoir 7 and the deposited mercury 4 is shown at the bottom of the electrolyte reservoir. As shown in FIG. 2, the electrical circuit comprises an ultraviolet responding semiconductor element 1 connected in parallel with a series connected resistor 6 and a positive characteristic heat sensing resistor 5. The temperature characteristic of the resistor 5 is shown in FIG. 4. The electrolyte reservoir 3 is also connected in parallel with said circuit comprising the positive characteristic resistor 5 and the resistor 6.

When measuring ultraviolet energies as indicated by the amount of mercury deposited by electrolyzing the electrolyte with the photocurrent produced by the ultraviolet responsive semiconductor element 1, the photocurrent of the semiconductor becomes smaller, as shown in FIG. 3, as the ambient temperature increases. At the same time, the resistance value of the positive characteristic heat sensing resistor 5 becomes greater, as shown in FIG. 4. Thus, the electrical current flowing through the circuit 5 becomes small, making it possible to keep the electrical current inside the electrolyte reservoir 3 constant.

More specifically, the photocurrent flowing through said electrolyte reservoir 3 utilizing a light sensing element provided with a fixed intensity of ultraviolet rays will be 0.28 mA at an ambient temperature of 25°C and 0.18 mA at an ambient temperature of 70°C, as shown in FIG. 3, if the means for eliminating the influence of an ambient temperature is not provided. The photocurrent flowing through said electrolyte reservoir, however, will be constantly 0.18 mA, irrespective of the ambient temperature, as shown in FIG. 5, if said electrolyte circuit is connected in parallel with the circuit including the positive characteristic heat sensing resistor having the characteristic curve shown in FIG. 4. This resistor has a value of 47 ohms at an ambient temperature of 25°C and 560 ohms at a temperature of 70°C, and is connected in series with a resistor of 20 ohms.

From the foregoing it will be apparent that with the use of the instant invention, an accurate light energy measure can be made by converting the integrated output current of a light sensing element into an amount of deposited mercury, and a true value can be obtained regardless of the ambient temperature.

What is claimed is:

1. In a device for measuring ultraviolet energy which comprises an ultraviolet responsive semiconductor element, an electrolyte reservoir means containing a solution of mercury iodine, electrode means within said reservoir for removing said mercury from said solution in response to current flowing in said electrode means and for depositing said separated mercury, scale means associated with said reservoir for indicating the amount of mercury so deposited, said semiconductor element being electrically connected to said electrode means, and a means for eliminating the influence of the ambient temperature on said ultraviolet responsive semiconductor element operatively coupled thereto, the improvement comprising said means for eliminating the influence of the ambient temperature being comprised of a low resistance positive characteristic heat sensing resistance member connected in parallel with said electrode means of said electrolyte reservoir to maintain a substantially uniform electrolyte current over the operative ambient temperature range.

* * * * *